US010060554B2

(12) United States Patent
Manaresi et al.

(10) Patent No.: US 10,060,554 B2
(45) Date of Patent: Aug. 28, 2018

(54) MICRO-FLUIDIC SYSTEM

(75) Inventors: Nicolò Manaresi, Bologna (IT); Gianni Medoro, Casalecchio di Reno (IT); Alex Calanca, Mirandola (IT)

(73) Assignee: Menarini Silicon Biosystems S.p.A., Castel Maggiore (IT)

( * ) Notice: Subject to any disclaimer, the term of this patent is extended or adjusted under 35 U.S.C. 154(b) by 887 days.

(21) Appl. No.: 13/516,087

(22) PCT Filed: Dec. 16, 2010

(86) PCT No.: PCT/IB2010/003280
§ 371 (c)(1),
(2), (4) Date: Sep. 14, 2012

(87) PCT Pub. No.: WO2011/073784
PCT Pub. Date: Jun. 23, 2011

(65) Prior Publication Data
US 2013/0037139 A1 Feb. 14, 2013

(30) Foreign Application Priority Data

Dec. 17, 2009 (IT) .............................. BO2009A0808

(51) Int. Cl.
*F16K 31/00* (2006.01)
*F16K 99/00* (2006.01)
(52) U.S. Cl.
CPC ...... *F16K 99/0001* (2013.01); *F16K 99/0015* (2013.01); *F16K 99/0059* (2013.01);
(Continued)

(58) Field of Classification Search
CPC ............. F16K 99/0015; F16K 99/0059; F16K 2099/0074; F16K 99/0001;
(Continued)

(56) References Cited

U.S. PATENT DOCUMENTS 5,309,943 A * 5/1994 Stevenson et al. ........ 137/625.5
5,932,799 A * 8/1999 Moles .......................... 73/53.01
(Continued)

FOREIGN PATENT DOCUMENTS

DE 199 49 912 A1 5/2001
EP 1 905 514 A1 4/2008
(Continued)

OTHER PUBLICATIONS

International Search Report in international patent application No. PCT/IB2010/003280, dated Jun. 1, 2011.
(Continued)

*Primary Examiner* — Umashankar Venkatesan
(74) *Attorney, Agent, or Firm* — Marshall, Gerstein & Borun LLP

(57) ABSTRACT

A micro-fluidic system comprising a micro-fluidic channel, which has a wall provided with a hole; a closing element, which is partially housed within the hole and has a membrane portion adapted to deform and a side portion sealingly connected with the above mentioned wall; and a partition arranged within the micro-fluidic channel between a first and a second segment; the closing element is deformable between a locked configuration in contact with the partition and an open configuration spaced from the partition; the closing element may be deformed by suction or by a rod or a piston.

29 Claims, 8 Drawing Sheets

(52) U.S. Cl.
CPC .. *F16K 99/0034* (2013.01); *F16K 2099/0074* (2013.01); *F16K 2099/0078* (2013.01); *Y10T 137/85938* (2015.04)

(58) Field of Classification Search
CPC ........... F16K 2099/0078; F16K 99/034; Y10T 137/85938
USPC ............ 251/129.06, 61.1, 11; 422/68.1, 417, 422/502, 503, 537
See application file for complete search history.

(56) References Cited

U.S. PATENT DOCUMENTS

| | | | |
|---|---|---|---|
| 5,967,163 A * | 10/1999 | Pan et al. | 137/1 |
| 6,680,206 B1 * | 1/2004 | McDevitt et al. | 436/172 |
| 7,258,774 B2 * | 8/2007 | Chou et al. | 204/450 |
| 7,284,966 B2 * | 10/2007 | Xu | F04B 43/043 417/395 |
| 7,438,030 B1 * | 10/2008 | Okojie | 123/90.11 |
| 9,121,525 B2 * | 9/2015 | Calanca | F16K 99/0001 |
| 9,127,783 B2 * | 9/2015 | Perozziello | F16K 99/0015 |
| 2004/0036047 A1 * | 2/2004 | Richter | 251/129.06 |
| 2004/0209354 A1 * | 10/2004 | Mathies et al. | 435/287.2 |
| 2005/0245889 A1 * | 11/2005 | Haecker | B01L 3/502707 604/403 |
| 2007/0200081 A1 * | 8/2007 | Elizarov et al. | 251/331 |
| 2010/0266432 A1 * | 10/2010 | Pirk | F04B 43/043 417/472 |
| 2010/0303687 A1 * | 12/2010 | Blaga et al. | 422/504 |
| 2011/0305607 A1 * | 12/2011 | Jung et al. | 422/502 |
| 2013/0032235 A1 * | 2/2013 | Johnstone et al. | 137/833 |

FOREIGN PATENT DOCUMENTS

| | | |
|---|---|---|
| WO | WO-99/17749 A1 | 4/1999 |
| WO | WO-2004/061085 A2 | 7/2004 |
| WO | WO-2008/115626 A2 | 9/2008 |
| WO | WO-2010/106426 A1 | 9/2010 |
| WO | WO-2010/106428 A2 | 9/2010 |
| WO | WO-2010/106434 A1 | 9/2010 |

OTHER PUBLICATIONS

Written Opinion of the International Searching Authority for corresponding International Application No. PCT/IB2010/003280, dated Jun. 1, 2011.

International Preliminary Report on Patentability, corresponding International Application No. PCT/IB2010/003280, dated Jun. 19, 2012.

* cited by examiner

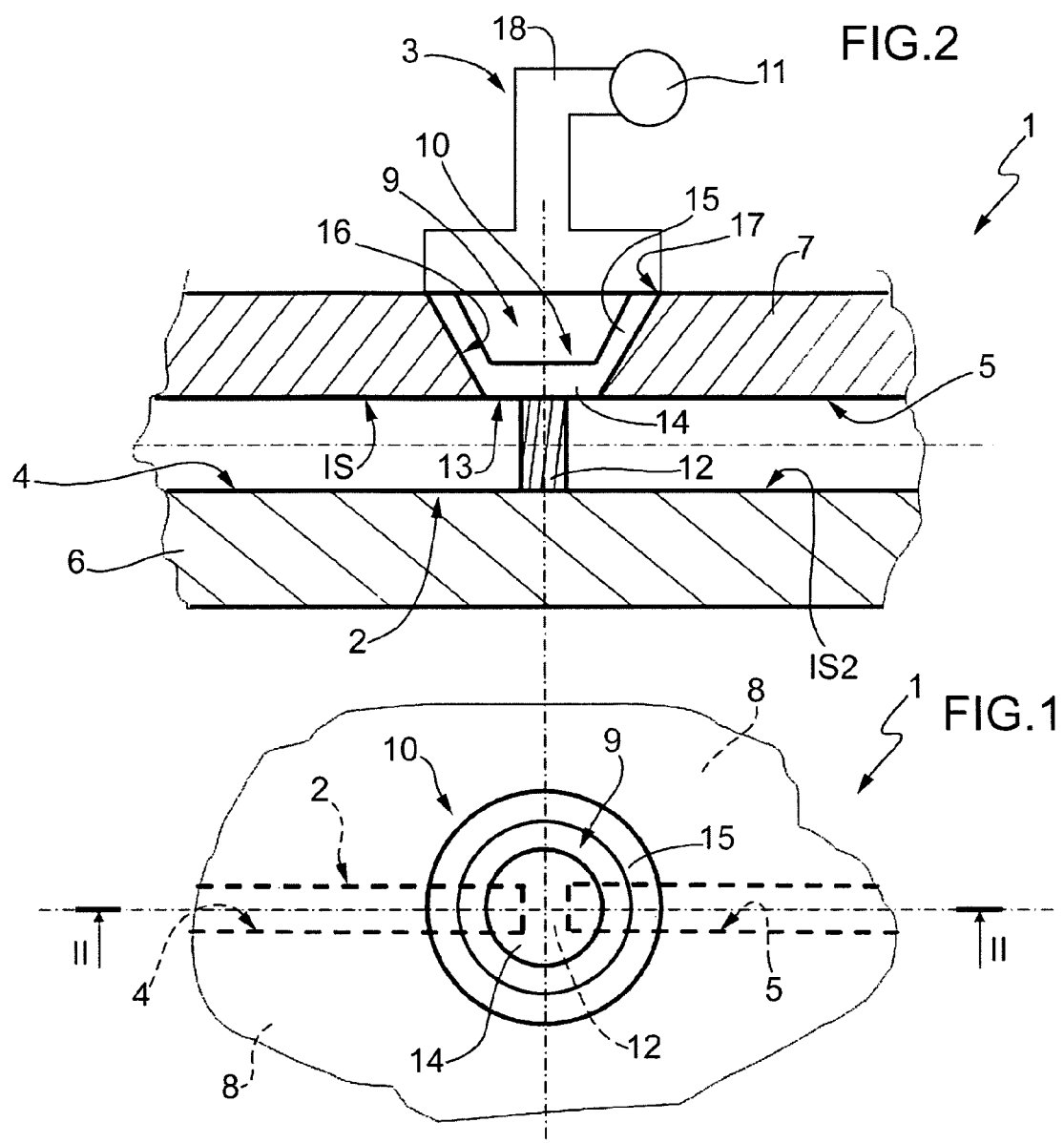

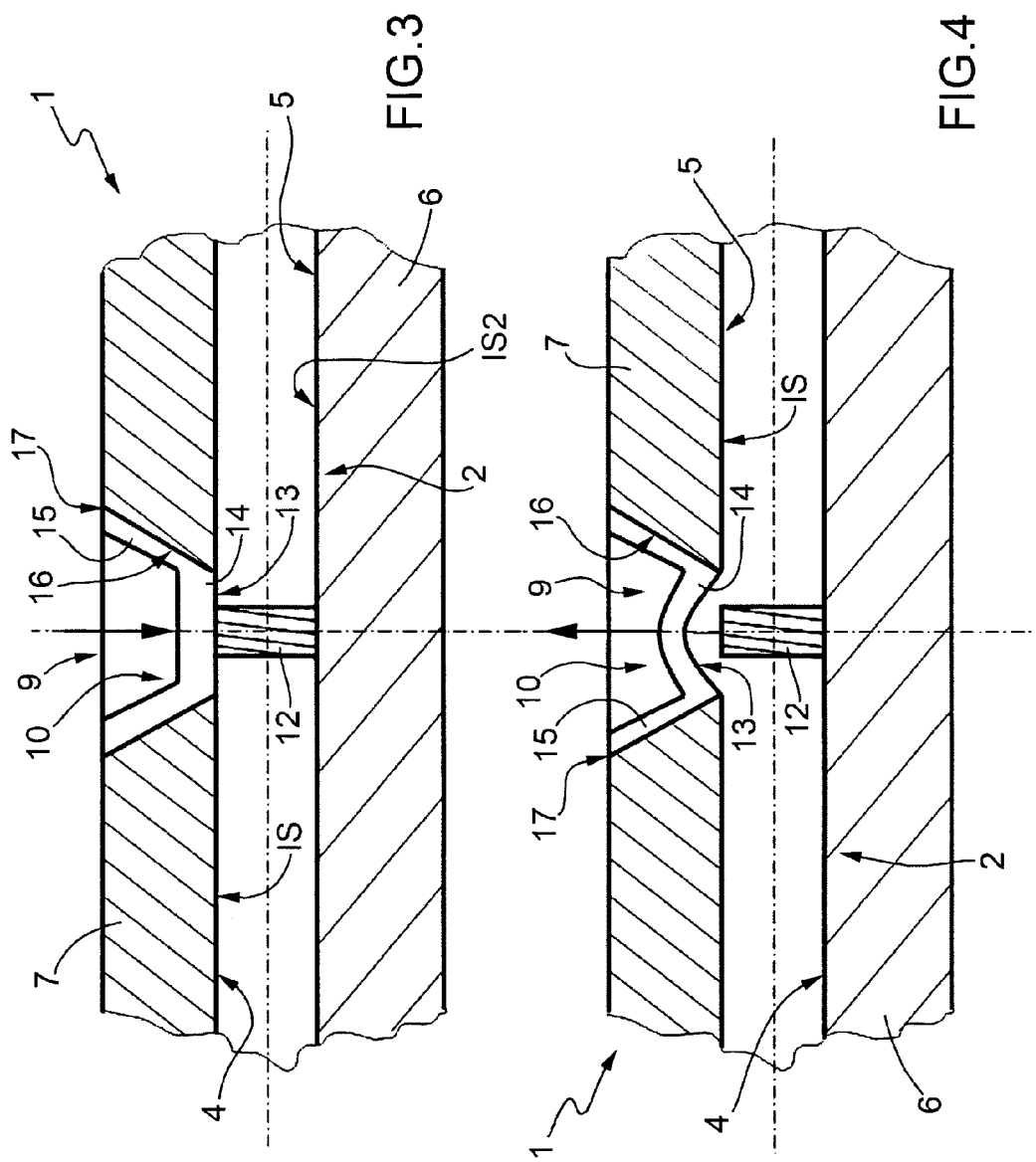

MICRO-FLUIDIC SYSTEM

CROSS-REFERENCE TO RELATED APPLICATIONS

This application is the U.S. national phase of International Application No. PCT/IB2010/003280, filed Dec. 16, 2010, which claims the benefit of Italian Patent Application No. BO2009A 000808, filed Dec. 17, 2009.

TECHNICAL FIELD

The present invention relates to a microfluidic system.

BACKGROUND ART

In the micro-fluidic field there is known a type of system comprising a channel, which includes two segments connected to one another by a valve. The valve usually includes a partition arranged along the channel to separate the two segments and a membrane of an elastomeric material connected to a wall of the channel in the area of two holes, each of which is arranged at an end of a respective segment in the area of the partition. The valve further comprises a pneumatic actuator, which is adapted: on one side, to create a depression so as to deform the membrane and, therefore, connect the two segments of the channel; on the other side, to exert a pressure to push the membrane against the wall of the channel so as to close the two holes and isolate the two segments.

Known valves and circuits of the above indicated type are for example disclosed in WO2008115626 (see in particular FIG. 2) and in WO2004061085 (see in particular FIGS. 1A-1E) and have several drawbacks.

A first series of drawbacks derives from the fact that the pneumatic actuator needs to always be active (both when the valve is to be opened, and when the valve is to be closed). This determines a high energy consumption and a considerable wear. It should also be noted that pneumatic actuators having the suitable size to create both a depression and a compression are relatively complex and expensive.

Furthermore, it should be noted that the preparation of this type of valves is often complex. Some of the problems in this connection are due to the fact that the membrane must often be selectively connected to the wall of the channel and not to the partition.

Patent documents EP1905514, DE19949912, WO9917749 disclose especially complex micro-fluidic systems comprising channels the geometrical structures of which is complicated and difficult to implement.

Further drawbacks of the state of the art are related to the fact that it is not always possible to correctly maintain the membrane in position and/or obtain an effective coupling between the membrane and the partition.

Disclosure of Invention

It is an object of the present invention to provide a micro-fluidic system, which allows to overcome, at least partially, the drawbacks of the state of the art and are, at the same time, easy and cost-effective to implement.

According to the present invention, there are provided a micro-fluidic system according to the following independent claims and, preferably, according to any of the claims directly or indirectly dependent on the independent claims.

Unless otherwise explicitly specified, the following terms have the following meaning in the following text.

The term "immediately" means without the substantial interposition of further elements (and possibly also of empty spaces).

By equivalent diameter of a section there is intended the diameter of a circle having the same area of the section.

By section of a channel or of a duct there is intended the section substantially perpendicular to the longitudinal extension of the channel (or duct) i.e. to the feeding direction of the fluid in the channel (or duct).

By equivalent diameter of a hole there is intended the diameter of a circle having the same area as the smallest cross section of the hole.

By micro-fluidic system there is intended a system comprising at least one micro-fluidic channel and a valve arranged along the channel.

By microfluidic channel there is intended a channel having a section with an equivalent diameter lower than 1 mm (in particular, smaller than 0.5 mm).

BRIEF DESCRIPTION OF THE DRAWINGS

The invention will now be described with reference to the accompanying drawings, which show non-limitative embodiments thereof, in which:

FIG. 1 is a diagrammatic top view, with details removed for clarity, of a micro-fluidic system made according to the present invention;

FIG. 2 is a cross section along plane II-II of the microfluidic system of FIG. 1;

FIGS. 3 and 4 show details of the section of FIG. 2 in two different operative configurations;

BEST MODE FOR CARRYING OUT THE INVENTION

Figure 6:
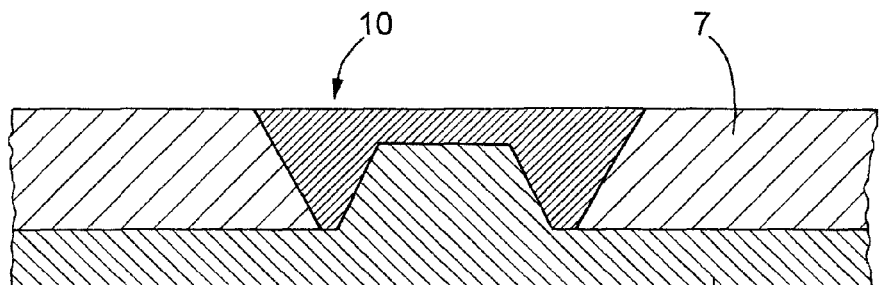
FIGS. 6 and 7 show two steps of the production of components of the micro-fluidic system of FIG. 5.

In FIG. 1, numeral 1 indicates as a whole a microfluidic system comprising a micro-fluidic channel 2 and a valve 3, which is adapted to adjust the transfer of fluid (in particular of liquid) from a segment 4 to a segment 5 (and/or vice versa) of channel 2.

System 1 comprises a support wall 6, which serves as bottom wall of channel 2; a covering wall 2, which serves as top wall of channel 2; and a spacer element 8, (shown partially) which sealingly connects wall 6 and wall 7 and defines channel 2 laterally and at the ends (not shown). In particular, spacer element 8 comprises two end portions (not shown); and two side portions (partially shown in FIG. 1) which extend continuously, parallelly to the plane of the sheet of FIG. 2, on opposite sides of end portions (not shown) so as to sealingly connect wall 6 and wall 7. The side portions are transversal (in particular, substantially perpendicular) and sealingly connected to the end portions (not shown).

Wall 7 has a hole 9, which is arranged between segments 4 and 5; and, according to some embodiments, two end holes (not shown), which are arranged at opposite ends of channel 2 and are adapted to connect channel 2 with further ducts/channels (not shown) of system 1 or with the outside. Wall 7 has an inner surface IS partially delimiting channel 2 (in particular, on top).

Segments 4 and 5 are substantially coplanar to one another. In particular, channel 2 is substantially linear.

Inner surface IS extends (immediately) downstream and (immediately) upstream of valve 3 so as to partially delimit (in particular on the top) micro-fluidic channel 2 in the area of segments 4 and 5. In particular, the (part of) inner surface IS2 present in the area of segment 4 is substantially coplanar to (part of) inner surface IS present in the area of the second segment.

System 1 (in particular, wall 6) comprises an inner surface IS2, which substantially faces inner surface IS. More precisely, surfaces IS and IS2 are parallel to one another.

Surface IS2 extends (immediately) downstream and (immediately) upstream of valve 3 so as to partially delimit (in particular on the bottom) micro-fluidic channel 2 in the area of segments 4 and 5. The (part of) inner surface IS2 present in the area of segment 4 is substantially coplanar to (part of) inner surface IS2 present in the area of the second segment.

According to some embodiments, wall 6 is made of silicon; wall 7 is made of glass; spacer element 8 is made of a photoresist material.

By photoresist material there is intended a material obtained from an electromagnetic radiation (in particular, in the range of visible light and infrared) sensitive material which, if exposed to these electromagnetic radiations, may become soluble (in this case the photoresist material is a positive photoresist) or insoluble (in this case the photoresist material is a negative photoresist) in specific solvents (usually designated developer photoresists).

According to some embodiments, the photoresist material is a negative photoresist.

According to some embodiments, the photoresist material is selected from the group consisting of: acrylic polymer, polymethylglutarimide, at least partially crosslinked SU-8 and a mixture of diazonaphthoquinone with a phenolformaldehyde. In particular, the photoresist material is selected from the group consisting of: acrylic polymer, at least partially crosslinked SU-8.

In the present text, by acrylic polymer there is intended a polymer obtained by the polymerisation of at least one acrylic monomer. In particular, by acrylic polymer there is intended a polymer obtained by the polymerisation of an acrylic monomer.

The acrylic monomer is selected from alkyl esters of acrylic acid or of methacrylic acid, in which in particular the alkyl has one to six carbon atoms.

According to some embodiments, the acrylic monomer is selected from the group consisting of: methylmethacrylate (MMA), ethylmethacrylate, propylmethacrylate, buthylmethacrilate, methylacrilate, ethylacrilate, buthylacrilate. Advantageously, the acrylic monomer is selected from the group consisting of: methylacrylate, ethylacrilate, butylacrilate. In particular, the acrylic polymer is a polymethylacrilate.

Advantageously, the acrylic polymer is crosslinked.

According to specific embodiments, the photoresist is obtained by treating Dryresist Ordyl SY300 of Elga Europe with light radiations.

According to further embodiments, wall 6, wall 7 and spacer element 8 may be made of materials other than those indicated above.

Channel 2 has a section having an equivalent diameter from 10 µm to 0.5 mm. According to some embodiments, the section of channel 2 is substantially constant.

Hole 9 has an equivalent diameter from 100 µm to 1 mm. Advantageously, hole 9 has an equivalent diameter from 200 µm to 1 mm. According to some embodiments, hole 9 has a diameter smaller than 0.5 mm.

The dimensions indicated in the present text may be measured in a standard manner with profilometers.

According to some embodiments hole 9 has a shape selected from the group consisting of: substantially frusto-conical, substantially frusto-pyramidal, substantially parallelepipedal, substantially cylindrical. Advantageously, holes 9 have a substantially frusto-conical, substantially frusto-pyramidal (in particular substantially frusto-conical—as in the embodiment shown in FIGS. 1 and 2).

Valve 3 includes a closing element 10 comprising (in particular, consisting of) a substantially elastic material (in particular, an elastomer); and an actuator 11, which is adapted to displace closing element 10 from a locked position (shown in FIG. 3) to an open position (shown in FIG. 4).

According to some embodiments, actuator 11 comprises a suction system (in particular a pump).

According to some embodiments, closing element 10 may consist of a single elastomeric material (i.e. an elastomer) or by a combination (for example a mixture) of several different elastomeric materials.

Advantageously, the elastomer comprises (in particular consists of) a silicone, in particular a silicone rubber. According to some embodiments, the silicone has the following formula:

wherein n is an integer greater than 4, each R is selected, independently of the others, from the group consisting of: methyl, ethyl, propyl.

According to some embodiments the elastomer comprises (i.e. consists of) only one silicone or, alternatively, several different silicones.

Advantageously, the elastomer has an elastic modulus from 750 KPa to 2500 KPa.

Micro-fluidic system 1 (in particular, valve 3) further comprises a partition 12 arranged within micro-fluidic channel 2 between segments 4 and 5. In particular, partition 12 separates segments 4 and 5. Partition 12 projects from inner surface IS2 (in particular, towards hole 9).

Partition 12 is adapted to separate segments 4 and from one another. When closing element 10 is in a locking configuration (FIG. 3), closing element 10 is adapted to cooperate with (in particular is in contact with) partition 12 to sealingly isolate segment 4 with respect to segment 5. In particular, in the locked configuration, closing element 10 is adapted to close on top the open ends of segments 4 and 5. When closing element 10 is in an open configuration (FIG. 4), partition 12 and closing element 10 are spaced from one another, and the fluid (in particular the liquid) may pass from segment 4 to segment 5 (or vice versa) "overcoming" partition 12.

Advantageously, partition 12 extends from wall 6 for a height substantially equivalent to the distance between walls 6 and 7 in the area of hole 9. In this manner, in resting conditions (i.e. when actuator 11 exerts neither a negative nor a positive pressure on closing element 10), closing element 10 is in contact with partition 12.

According to some advantageous embodiments, partition 12 is connected (in particular is integral) with spacer element 8. Advantageously, (therefore) spacer element 8 and partition 12 are of the same material. In particular, partition 12 is made of a photoresist material.

Closing element 10 is connected to wall 7 in the area of hole 9 and has a contrast surface 13, which is in contact with partition 12 and extends coplanar to said inner surface IS.

According to some embodiments, closing element 10 comprises a closing portion 14, which has opposition surface 13 and is deformable so as to move away from partition 12 when actuator 11 shifts closing element 10 in the open configuration; and at least one side portion that extends from the edge of closing portion 14 outwards and along a delimiting surface 16 of said hole 9. Advantageously, closing portion 14 is substantially a membrane.

According to some embodiments, side portion 15 extends along the peripheral edge of closing portion 14.

According to specific embodiments, closing element 10 has a width from 700 μm to 2 mm; closing portion 14 has a thickness from 100 to 200 μm; the side portion 15 has a height from closing portion 14 from about 110 μm to about 700 μm.

Advantageously, side portion 15 extends up to at least one outer delimiting edge 17 of hole 9. In particular, side portion 15 extends along (at least) the whole delimiting surface 16 of hole 9.

According to the embodiment shown in FIG. 2, actuator 11 is a suction system (in particular a pump) and is sealingly connected to hole 9 by means of a duct 18. Advantageously, in use, actuator 11 exerts a positive pressure on closing element 10 so as to push closing element 10 against partition 12 (FIG. 3—locked configuration). In this manner the sealing between closing element 10 and partition 12 is improved.

According to other embodiments, the actuator is a system that acts mechanically on closing element 10. The mechanical action may be exerted by a rod 21 (for opening or closing) or by a piston (only for closing).

The mechanical action may be determined in turn by an electromechanical system (such as for instance an electromagnet that determines a displacement of the rod or piston, or by a screw system connected to a motor), or by a purely mechanical system (such as a spring).

The actuator allows to switch between open valve and closed valve, according to one of the following methods or combination of methods:
1. closing:
    a. pneumatic, by means of a duct for creating a pressure on the outer side of the closing element;
    b. mechanical, by means of a rod or piston, for exerting a pressure on the closing element;
    c. by pre-tensioning closing element 10, which determines a fluid-tight coupling with partition 12;
2. opening:
    a. pneumatic (by means of a duct for creating a depression on the outer side of the closing element)
    b. mechanical (by means of a rod or piston, for exerting a depression on the closing element)
    c. by pre-tensioning closing element 10, which determines, when resting, an outward deflection of the micro-fluidic channel, creating a path for the fluid above partition 12.

When segments 4 and 5 are to be connected, the operation of actuator 11 is inverted. Actuator 11 (therefore) exerts a negative pressure (suction) on closing element 10 so as to deform closing element 10 and separate it from partition 12 (FIG. 4—open configuration). Thereby, segments 4 and 5 are connected to one another.

According to some embodiments, closing element 10 and wall 7 are connected to one another by one of the connections selected from the group consisting of: lock-joint, adhesive joint, opposition joint and a combination thereof. Advantageously, this connection is substantially tight fluid.

As shown for the embodiments of FIGS. 1-4 and 17, side portion 15 and delimiting surface 16 of hole 9 are connected to one another by means of an adhesive connection. Advantageously, the adhesive connection is obtained by plasma treatment. According to some embodiments, the adhesive connection is obtained by the polymerisation or hardening (crosslinking) in situ (i.e. within hole 9) of an at least partially polymerisable or hardenable (crosslinkable) material to obtain closing element 10.

Figure 17:
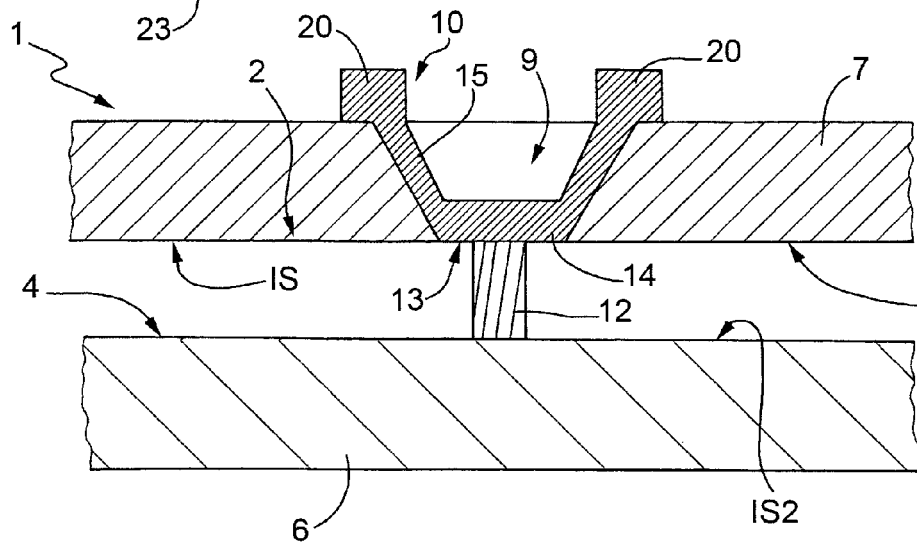
FIG. 17 shows details of a side section of an embodiment of a system produced according to the present invention.

The embodiment shown in FIG. 17 differs from the embodiment of FIGS. 1-4 substantially in the shape of closing element 10, which in this case has a relief portion 20 extending along the edge of closing portion 14. Portion 20 serves as a gasket and allows to improve the sealing connection with duct 18.

According to some embodiments (see for example FIG. 13), side portion 15 has a seat 19 at an end thereof opposite to closing portion 14. Seat 19 is engaged by outer delimiting edge 17 of hole 9 so as to define a lock-joint.

Figure 9:
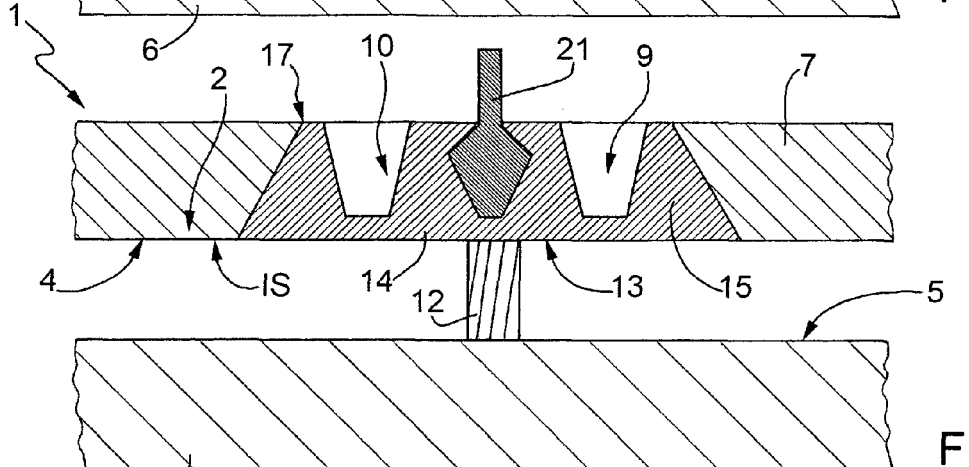
FIGS. 9 and 10 show details of a side section of an embodiment of a system produced according to the present invention.
Figure 10:
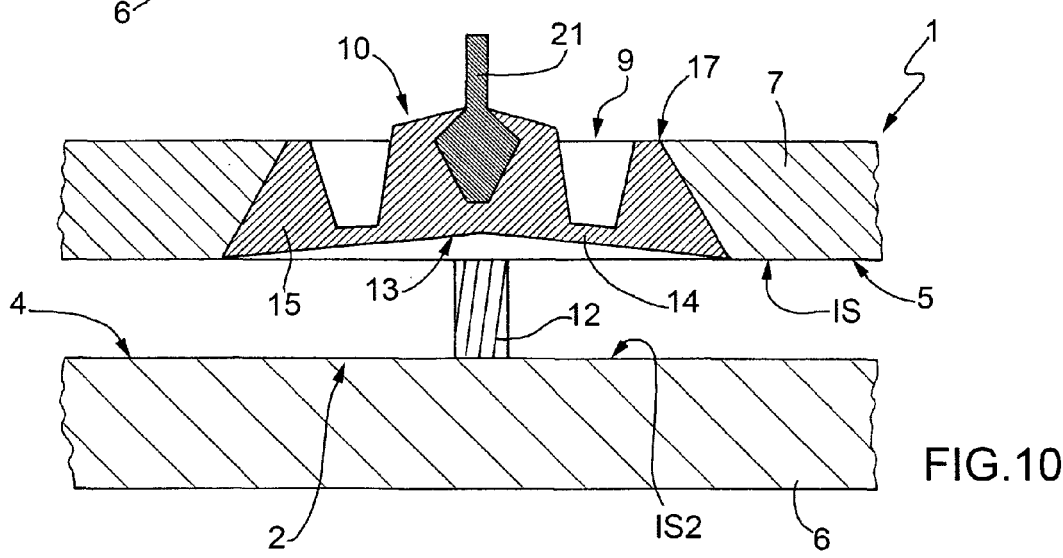
Figure 13:
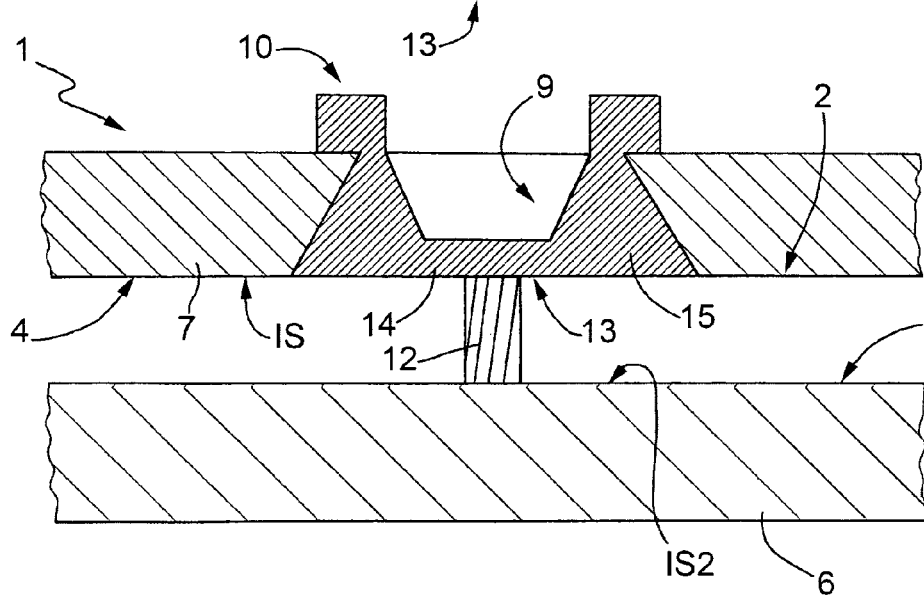
FIG. 13 shows details of a side section of an embodiment of a system produced according to the present invention.
Figure 21:
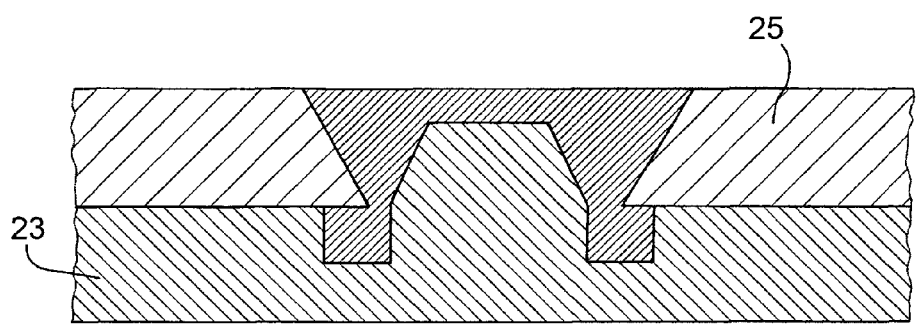
FIGS. 21 and 22 show two steps of the production of the component of FIG. 14.
Figure 22:
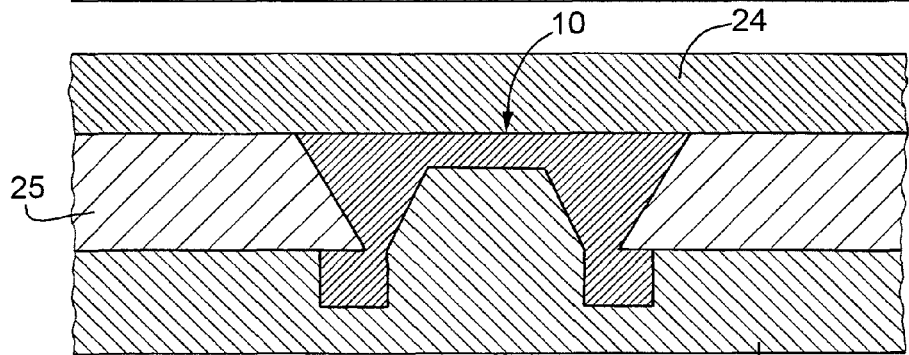
Figure 14:
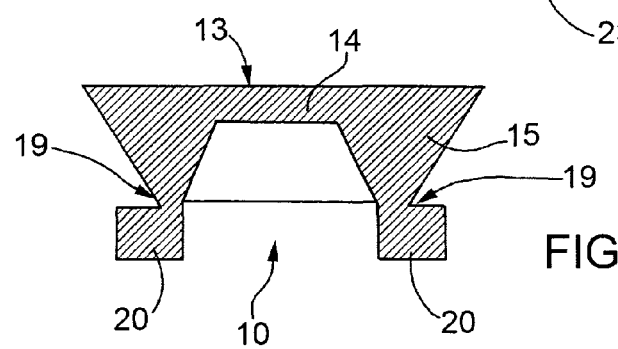
FIG. 14 shows a component of the system of FIG. 13.

According to some embodiments, such as for example those shown in FIGS. 13, 9 and 10, hole 9 is tapered by micro-fluidic channel 2 outwards (in other words, it broadens inwards) so as to define an opposition joint together with side portion 15. In particular, it should be noted that closing element 10 remains correctly within hole 9 in virtue of the cooperation of delimiting surface 16 and partition 12.

In the variant shown in FIGS. 9 and 10, actuator comprises an operating rod 21 which has a head engaged in a seat 22 of closing element 10.

It should be noted that, advantageously, side portion 15 has a shape complementary to that of hole 9 and in particular of delimiting surface 16.

System 1 according to the present invention has several advantages with respect to the state of the art.

In particular, actuator 11 does not need to always be active. In this connection, it may be noted that the unusual geometry of system 1 (and in particular, of closing element 10 and of partition 12) allows, in resting conditions (i.e. when actuator 11 exerts neither a negative nor a positive pressure), closing element 10 to cooperate with partition 12 sufficiently as to isolate segments 4 and 5. Furthermore, when a positive pressure is exerted on closing element 10, the coupling between closing element 10 and partition 12 is particularly effective.

Another advantage of system 1 according to the present invention is related to the coupling between closing element 10 and wall 7 being particularly simple and stable.

System 1 according to the present invention may advantageously be used in an apparatus for separating particles as for example disclosed in one of the following Italian patent applications and patent applications claiming the priority thereof: BO2009A000152, BO2009A000153, BO2009A000154, BO2009A000155.

Unless explicitly indicated otherwise, the content of the references (papers, texts, patent applications etc.) cited in this text is herein incorporated by way of completeness of description. In particular, the above mentioned references are herein incorporated by reference.

Further features of the present invention will result from the following disclosure of some embodiments of microfluidic system 1 given by mere way of non-limitative illustration.

Example 1

This example discloses the production of closing element 10 of the embodiment of FIGS. 1-4.

Closing element 10 was made of PDMS (polydimethylsiloxane) (Sylgard 184® of Dow Corning—it should be noted however that other materials may be used).

Figure 18:
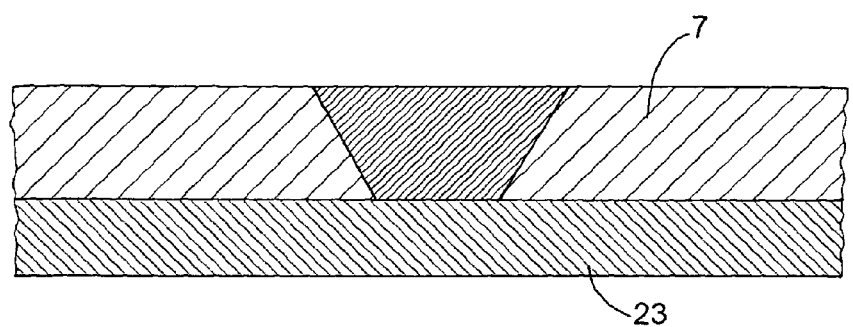
FIGS. 18 and 19 show two steps of the production of components of FIG. 20.
Figure 19:
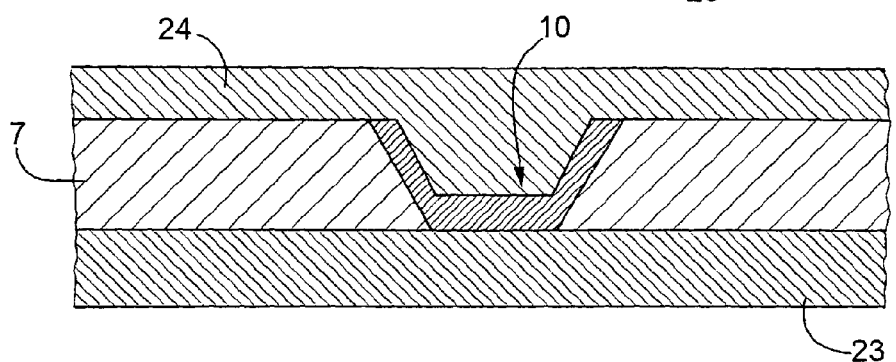
Figure 20:
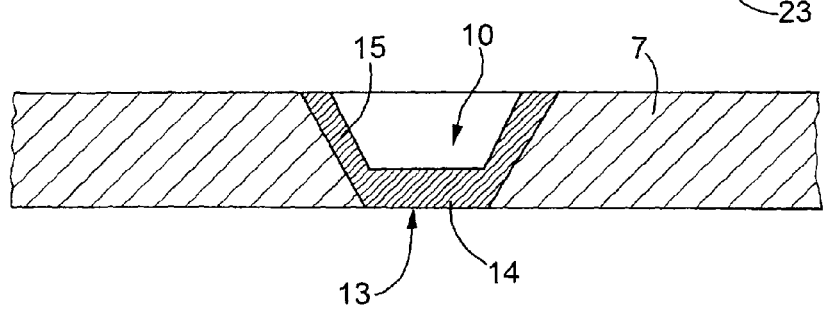
FIG. 20 shows components of the system of FIG. 1.

The hardening agent of PDMS (polydimethylsiloxane) and the base are mixed in a ratio of 1:10 and the mixture obtained thereby was poured in a hole 9 (FIG. 18) of a covering wall 7, which hole 9 is closed on the bottom by a base mould 23. PDMS was degassed in a vacuum chamber for one hour. A lid 24 is arranged on hole 9 to remove PDMS in excess and configure closing element 10 (FIG. 19). Wall 7 is inserted in an oven for 2 hours at 80° C. Closing element 10 is therefore obtained already connected to wall 7.

Example 2

This example discloses an alternative embodiment of closing element 10 of the embodiment of FIGS. 1-4.

Closing element 10 was made of PDMS (polydimethylsiloxane) (Sylgard 184® of Dow Corning—it should be noted however that other materials may be used).

The hardening agent of PDMS (tetra methyl tetravinyl cyclotetrasiloxane) and the base were mixed in a ratio of 1:10 and the mixture obtained thereby was poured in a mould which reproduces the shape of closing element 10 in negative. PDMS was degassed in a vacuum chamber for one hour. A lid was arranged on mould 26 to remove PDMS in excess. The covered mould was inserted in an oven for 2 hours at 80° C. Closing element 10 was then extracted from the mould by using a cutter.

Closing element 10 and wall 7 are treated in a plasma reactor (Gambetti Plasma, Modello Tucano) by using the parameters of table 1 in $O_2/N_2$ mixture.

TABLE 1

| Plasma activation | |
|---|---|
| Power, W | 40 |
| Voltage, V | 360 |
| Pressure, mbar | 0.3-0.4 |
| Time, s | 35 |

Closing element 10 was then introduced in hole 9 and was connected to delimiting surface 16 by the mentioned plasma treatment.

Example 3

Figure 5:
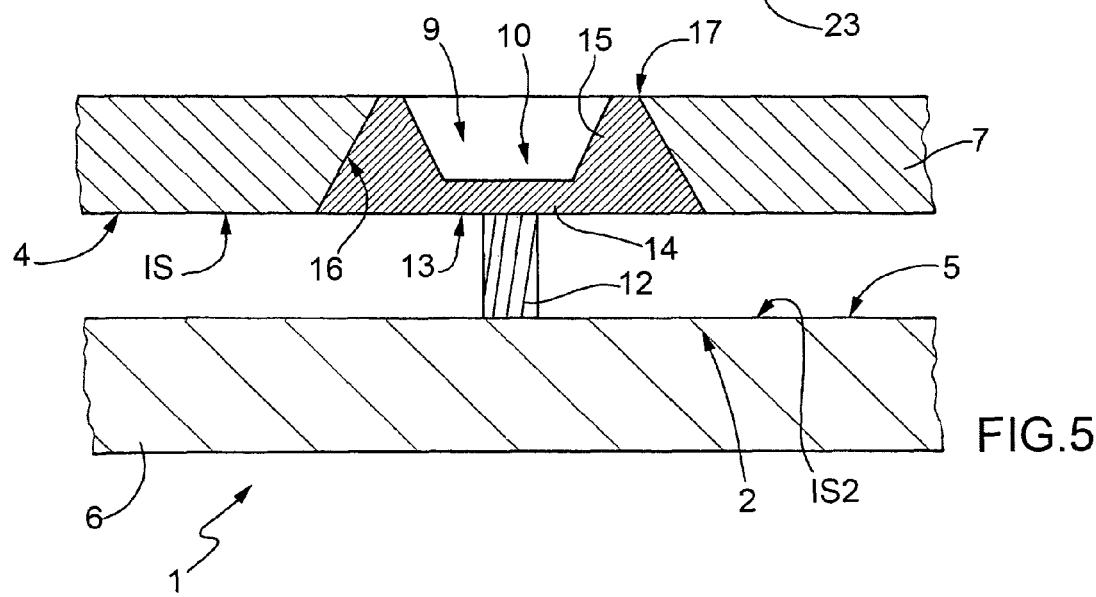
FIG. 5 is a section of a further embodiment of a microfluidic system made according to the present invention.
Figure 8:
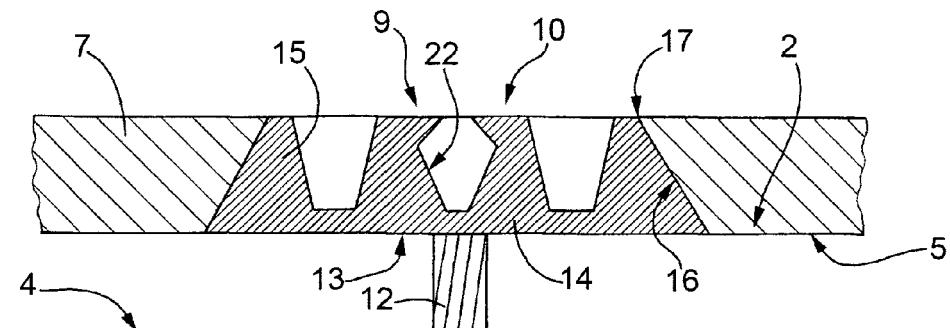
FIG. 8 shows some components of the system of FIGS. 9 and 10.

This example discloses the production of closing element 10 of the embodiment of FIG. 5.

Figure 7:
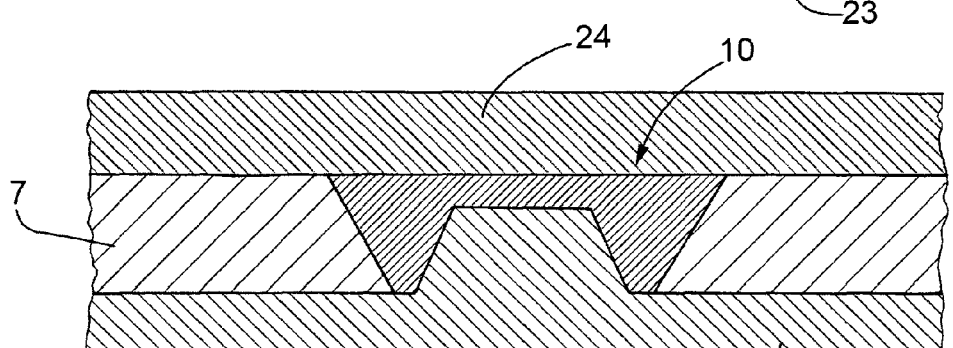

Closing element 10 of FIG. 5 is obtained following the procedure disclosed in example 1 and using a base mould 23, a lid 24 and a wall 7 therefor as shown in FIGS. 6 and 7.

Example 4

This example discloses the production of closing element 10 of the embodiment of FIG. 17.

Figure 15:
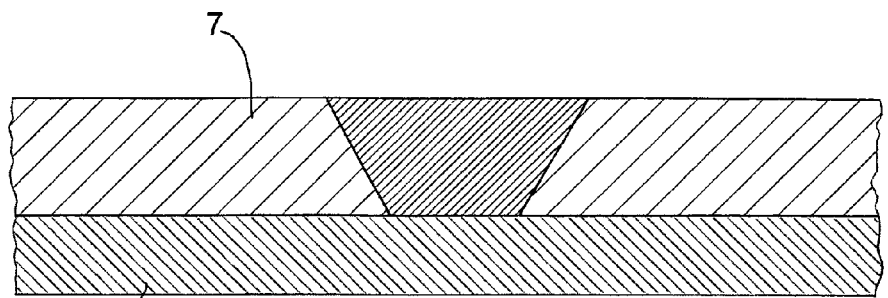
FIGS. 15 and 16 show two steps of the production of components of the micro-fluidic system of FIG. 17.
Figure 16:
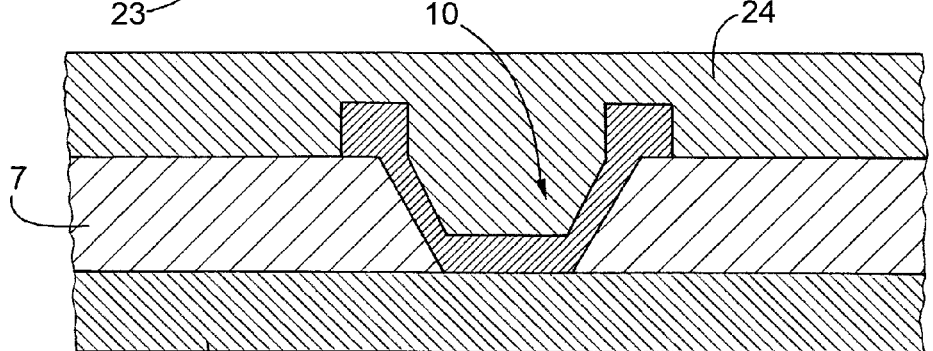

Closing element 10 of FIG. 17 is obtained following the procedure disclosed in example 1 and using a base mould 23, a lid 24 and a wall 7 therefor as shown in FIGS. 15 and 16.

Example 5

This example discloses the production of closing element 10 of the embodiment of FIG. 13 (or 14).

The closing element of FIG. 13 is obtained following the procedure disclosed in example 2 and using a base mould 23, a lid 24 and an intermediate mould 25 therefor as shown in FIGS. 6 and 7.

Figure 11:
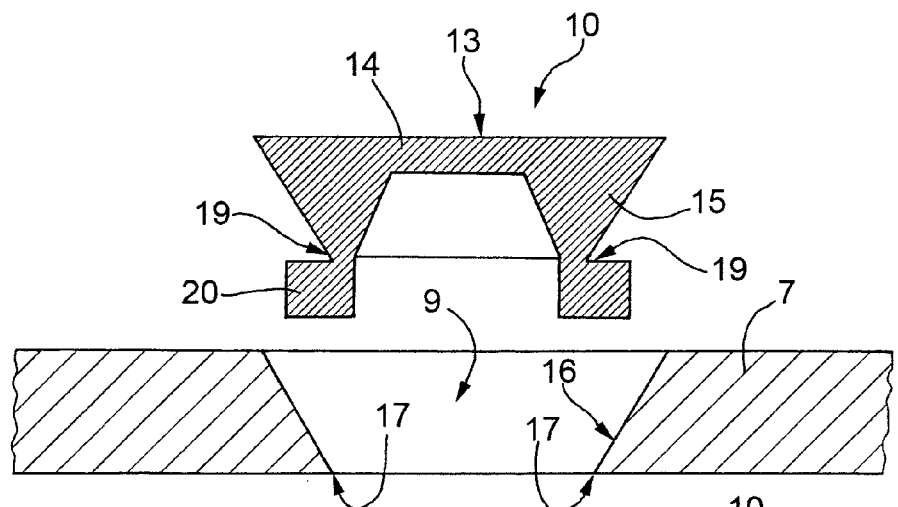
FIGS. 11 and 12 show a step of assembling the components of the micro-fluidic system of FIG. 13.
Figure 12:
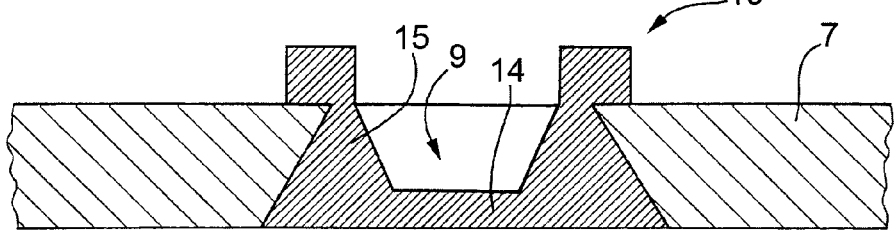

The combination of closing element 10 with corresponding wall 7 forms a lock joint as shown in FIGS. 11 and 12.

Example 6

This example discloses the implementation of microfluidic system 1 shown in FIGS. 1-4.

A layer of photo-polymer (Dryresist in particular Ordyl SY300, Elga Europe) (thickness 90 μm) was laminated at a 90° angle on support 6 of silicon (FIG. 11) (thickness 600 μm). The layer was therefore partially protected by a photolithographic mask (a transparent slide printed with a resolution of 24000 DPI) (FIG. 12) and subjected to UV radiation (150 W) for 15 seconds so that the areas of the layer which are exposed (i.e. not covered by the dark parts of the mask) polymerise. Once polymerisation was selectively performed, the non polymerised part was removed by dipping laminated substrate 6 in a developer (BMR developer—mixture of xylene, 2-butoxyethylacetate, mixture of isomers).

At this point, wall 6 with the corresponding spacer element 8 and partition 12 obtained thereby were heated in an oven at a temperature of 50° C. for 1 hour to obtain drying.

A glass layer of wall 7 (thickness 500 μm) was obtained by milling. Holes 9, and end holes have a frusto-conical shape with the bottom part having a diameter of 700 μm and the top part having a diameter of 1200 μm.

The mentioned glass layer was combined with closing element 10 according to what has been disclosed in example 1.

Wall 7 was pressed against spacer element 8 for 80 minutes at a temperature of 95° C. to obtain a thermal bond.

Example 7

The procedure of example 6 was repeated for each combination of closing element 10-wall 7 disclosed in examples 2 to 5 so as to obtain respective micro-fluidic systems.

The invention claimed is:
1. A micro-fluidic system comprising:
at least one micro-fluidic channel (2) comprising:
a first segment (4),
at least one second segment (5), and at least one wall (7), which is provided with at least one through hole (9) arranged between the first and the second segment (4, 5) and extending into the channel (2), wherein the at least one wall has an inner surface (IS) at least partially delimiting the micro-fluidic channel (2); and at least one valve (3), which is arranged along the microfluidic channel (2) in the area of the through hole (9) and comprises:
an actuator (11),
a closing element (10) comprising at least one substantially elastic material, and
a partition (12) arranged within the micro-fluidic channel (2) between the first and the second segment (4, 5);

wherein:
the actuator is adapted to actuate the closing element (10) between a locked configuration, in which the closing element (10) cooperates with the partition (12) so as to substantially isolate the first and the second segment (4, 5) from one another, and an open configuration, in which the first and the second segment (4, 5) are connected to one another;
the inner surface (IS) extends downstream and upstream of valve (3) so as to at least partially define the microfluidic channel (2) in the area of the first and second segment (4, 5);
the closing element (10) is connected to the wall (7) in the area of the through hole (9); and
the closing element (10) comprises:
a closing portion (14), which is deformable so as to move with respect to the partition (12) when the actuator (11) actuates the closing element (10) and has an opposing surface (13), which is in contact with the partition (12) and extends coplanar to said inner surface (IS) when in the locked configuration; and
at least one side portion (15) that extends from an edge of the closing portion (14) towards the outside of the micro-fluidic channel and at a non-zero angle to the opposing surface (13) and to the direction of the longitudinal extension of the micro-fluidic channel along a delimiting surface (16) of said through hole (9), wherein
the closing portion (14) further comprises an opposed surface located inside said through hole (9) between in a vertical direction the opposing surface (13) and an end of the at least one side portion (15), the end of the at least one side portion is opposite to the edge of the closing portion (14) from which the side portion extends.

2. The system according to claim 1, comprising a further inner surface (IS2), which substantially faces the inner surface (IS) and partially delimits the microfluidic channel (2) in the area of the first and second segment (4, 5); the partition (12) projects from the further inner surface (IS2) towards the hole (9); the inner surface (IS) in the area of the first segment (4) is substantially coplanar to the inner surface (IS) in the area of the second segment.

3. The system according to claim 1, wherein the closing element (10) and the wall (7) have a substantially fluid-tight connection selected from the group consisting of: lock-joint, adhesive joint, opposition joint and a combination thereof.

4. The system according to claim 1, wherein the closing portion (14) is substantially membrane-shaped; the side portion (15) extending up to at least one outer delimiting edge (17) of the hole (9); in particular, the side portion (15) extending along at least the whole of the delimiting surface (16).

5. The system according to claim 1, wherein the side portion (15) and the delimiting surface (16) of the hole (9) are connected to one another by means of an adhesive joint.

6. The system according to claim 5, wherein the adhesive joint is obtained by plasma treatment.

7. The system according to claim 1, wherein the side portion (15) has a seat (19) at an end of the side portion (15) opposite to the closing portion (14), the seat (19) being engaged by an outer delimiting edge (17) of the hole (9) so as to define a lock-joint.

8. The system according to claim 1, wherein the hole (9) is tapered from the micro-fluidic channel (2) outwards so as to define an opposition joint together with the side portion (15).

9. The system according to claim 1, wherein the side portion (15) extends along the whole peripheral edge of the closing portion (14).

10. The system according claim 1, wherein the hole (9) has a shape selected from the group consisting of: substantially frusto-conical, substantially frusto-pyramidal.

11. The system according to claim 1, wherein the micro-fluidic channel (2) has a section with an equivalent diameter greater than 10 μm.

12. The system according to claim 1, wherein the hole (9) has an equivalent diameter smaller than 1 mm, in particular greater than 100 μm.

13. The system according to claim 1, wherein the closing element (10) comprises (in particular consists of) at least one elastomer.

14. The system according to claim 1, wherein the elastomer comprises a silicone, in particular a silicone rubber.

15. The system according to claim 14, wherein the silicone has the following formula:

$$[R_2SiO]_n$$

wherein n is an integer greater than 4, each R is selected, independently of the others, from the group consisting of: methyl, ethyl, propyl.

16. The system according to claim 1, wherein the elastomer has an elastic modulus from 750 KPa to 2500 KPa.

17. The system according to claim 1, wherein the first and the second segment (4, 5) are substantially coplanar to one another; the partition (12) separating the first and the second segment (4, 5).

18. The system according to claim 1, wherein the inner surface (IS) in the area of the first segment (4) is substantially coplanar to the inner surface (IS) in the area of the second segment.

19. The system according to claim 1, wherein said actuator (11) comprises one or both of:
a. a duct for creating a pressure or a depression on the outer side of the closing element; and
b. a rod or piston, for exerting a pressure or a depression on the closing element.

20. The system according to claim 1, wherein the closing element (10) is pre-tensioned either so as to determine a fluid-tight coupling with the partition (12) or so that when resting, an outward deflection is determined with respect to the micro-fluidic channel, creating a path for the fluid above the partition (12).

21. A micro-fluidic system comprising:
at least one micro-fluidic channel comprising at least one wall having an inner surface that at least partially delimits the channel;

a partition disposed in the channel between first and second segments of the channel;
a hole disposed in the at least one wall and extending into the channel, wherein the hole has a delimiting surface that extends from the inner surface of the at least one wall to an opposed outer surface of the at least one wall;
a closing element disposed in the hole and connected to the wall, the closing element being coupled to an actuator for actuating the closing element between a locked configuration in which the first segment is isolated form the second segment, and an open configuration in which the first and second segments are in fluid communication, the closing element comprising:
a closing portion having an opposing surface that is coplanar with the inner surface and in contact in the partition when the closing element is in the locked configuration, the closing portion being deformable between a position in which the opposing surface is in contact with the partition and a position in which the opposing surface is disposed out of contact with the partition when the actuator actuates the closing element between the locked configuration and the open configuration, and
at least one side portion that extends along the entire delimiting surface of the hole, outwardly from an edge of the closing portion, wherein the at least one side portion is at a non-zero angle relative to the closing portion;
the closing portion having an opposed surface located inside said through hole between in a vertical direction the opposing surface and an end of the at least one side portion, the end of the at least one side portion being opposite from the edge of the closing portion from which the at least one side portion extends.

22. The micro-fluidic system of claim 21, wherein the closing element has a shape selected from the group consisting of substantially frusto-conical and substantially frusto-pyramidal.

23. A micro-fluidic system of claim 21, wherein the delimiting surface of the hole extends at non-zero angle with respect to the inner surface.

24. A micro-fluidic system, comprising:
at least one micro-fluidic comprising at least one wall having an inner surface that at least partially delimits the channel;
a partition disposed in the channel between first and second segments of the channel;
a hole disposed in the at least one wall and extending into the channel, wherein the hole has a delimiting surface that extends from the inner surface of the at least one wall to an opposed outer surface of the at least one wall;
a closing element disposed in the hole and connected to the wall, the closing element being coupled to an actuator for actuating the closing element between a locked configuration in which the first segment is isolated form the second segment, and an open configuration in which the first and second segments are in fluid communication, the closing element comprising:
a closing portion having an opposing surface that is coplanar with the inner surface and in contact in the partition when the closing element is in the locked configuration, the closing portion being deformable between a position in which the opposing surface is in contact with the partition and a position in which the opposing surface is disposed out of contact with the partition when the actuator actuates the closing element between the locked configuration and the open configuration, and
at least one side portion that extends along the entire delimiting surface of the hole, outwardly from an edge of the closing portion, wherein the at least one side portion is at a non-zero angle relative to the closing portion;
the closing portion having an opposed surface located inside said hole between in a vertical direction the opposing surface and an end of the at least one side portion, the end of the at least one side portion being opposite from the edge of the closing portion from which the at least one side portion extends,
wherein the non-zero angle as measured between the opposed surface and an inner surface of the at least one side portion is greater than 90°.

25. A micro-fluidic system, comprising:
at least one micro-fluidic channel comprising:
a first segment,
at least one second segment, and
at least one wall, which is provided with at least one hole arranged between the first and the second segment and extending into the channel, wherein the at least one wall has an inner surface at least partially delimiting the micro-fluidic channel; and
at least one valve, which is arranged along the microfluidic channel in the area of the hole and comprises:
an actuator,
a closing element comprising at least one substantially elastic material, and
a partition arranged within the micro-fluidic channel between the first and the second segment;
wherein:
the actuator is adapted to actuate the closing element between a locked configuration, in which the closing element cooperates with the partition so as to substantially isolate the first and the second segment from one another, and an open configuration, in which the first and the second segment are connected to one another;
the inner surface extends downstream and upstream of valve so as to at least partially define the microfluidic channel in the area of the first and second segment;
the closing element is connected to the wall in the area of the hole; and
the closing element comprises:
a closing portion, which is deformable so as to move with respect to the partition when the actuator actuates the closing element and has an opposing surface, which is in contact with the partition and extends coplanar to said inner surface when in the locked configuration; and
at least one side portion that extends from an edge of the closing portion towards the outside of the micro-fluidic channel and at a non-zero angle to the opposing surface and to the direction of the longitudinal extension of the micro-fluidic channel along a delimiting surface of said hole, wherein
the closing portion further comprises an opposed surface located inside said hole between in a vertical direction the opposing surface and an end of the at least one side portion, the end of the at least one side portion is opposite to the edge of the closing portion from which the side portion extends, wherein the non-zero angle as measured between the opposed surface and an inner surface of the at least one side portion is greater than 90°.

26. The micro-fluidic system of claim 1, wherein said wall is made of a substantially rigid and transparent material.

27. The micro-fluidic system of claim 1, wherein said wall is made of glass.

28. The micro-fluidic system of claim 21, wherein said wall is made of a substantially rigid and transparent material.

29. The micro-fluidic system of claim 21, wherein said wall is made of glass.

* * * * *